Figure 2:
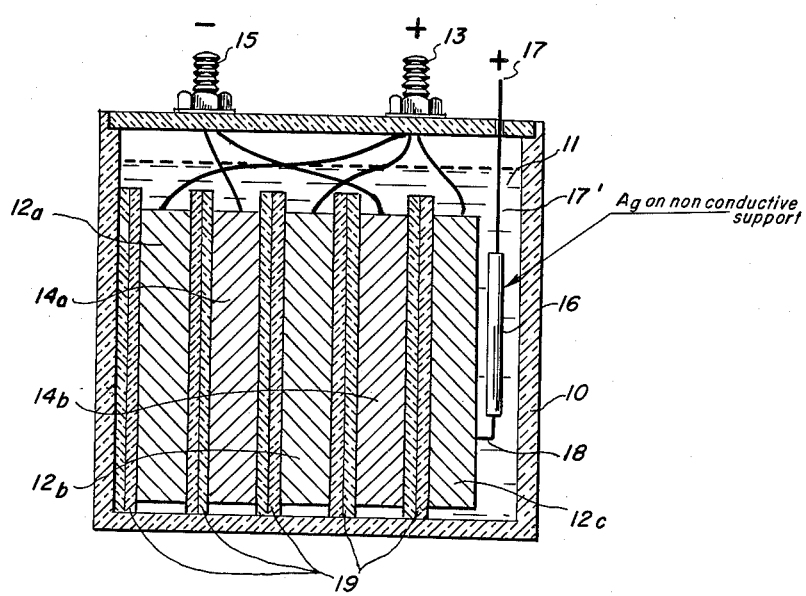
Figure 3:
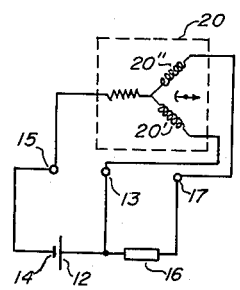
Figure 1:
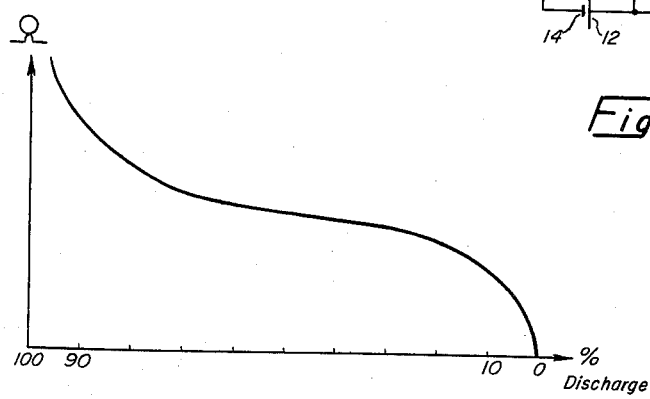

June 13, 1961     H. G. ANDRÉ     2,988,590

STATE-OF-CHARGE INDICATOR

Filed July 2, 1957

INVENTOR:
HENRY GEORGES ANDRÉ

BY

*Karl F. Ross*

AGENT

United States Patent Office 2,988,590
Patented June 13, 1961

2,988,590
STATE-OF-CHARGE INDICATOR
Henri Georges André, Montmorency, France, assignor to Yardney International Corp., New York, N.Y., a corporation of New York
Filed July 2, 1957, Ser. No. 669,511
11 Claims. (Cl. 136—182)

This invention relates to electrochemical batteries and more particularly to those batteries wherein upon discharge and/or charge certain chemical changes take place within the electrodes that cause variations in the conductivity of such electrodes.

It is known that alkaline battery cells do not possess a simple single attribute which will enable determination of the state of charge of the cell during either charge, storage or discharge. In lead-acid batteries the specific gravity of the electrolyte is such a state-of-charge indicator. There is, however, little or no change in the specific gravity of the alkaline solution used in the cells under discussion so that gravimetric tests will not serve the intended purpose.

The general object of the present invention is to provide simple means for determining the state of charge in an alkaline battery or accumulator.

I have found, in accordance with this invention, that certain electrodes adapted to be used in a cell of the alkaline type undergo oxidation and reduction reactions that profoundly affect the conductivity of the electrodes.

It is, therefore, a more specific object of this invention to provide a method of and means for determining the state of charge on the basis of conductivity changes within electrodes of this type.

It is a further object of this invention to provide a device adapted instantaneously to indicate the state of charge of an alkaline battery at any time.

It is another object of this invention to provide a novel battery including within its assembly a state-of-charge indicator.

More particularly, this invention envisages the measurement of the conductivity of an electrode which undergoes conductivity changes during cycling. Advantageously, this electrode is an auxiliary electrode which is cycled (charged and discharged) against the main battery electrode or electrodes of one polarity (e.g. negative) by being conductively connected to the electrode or electrodes of the opposite polarity (e.g. positive) whose composition is preferably identical with or similar to that of the auxiliary electrode. For a convenient determination of its conductivity, the latter electrode may be of elongated shape and may have an extremity connected to an auxiliary terminal, its other extremity being tied to the copolar main electrode or electrodes.

In a specific embodiment of the invention the auxiliary electrode is a silver electrode adapted to be used in a silver/zinc or a silver/cadmium battery; in other instances it may be, for example, a cadmium electrode forming part of the electrode assembly of a nickel/cadmium or a silver/cadmium cell.

The invention, as particularly applied to cells using silver electrodes, utilizes the chemical reaction in the positive plates whose active material in the uncharged state consists of silver and in the charged state consists of the suboxide and/or the peroxide of silver. These oxides are relatively poor electrical conductors, as compared to the silver, hence the conductivity changes in the electrode reflect the relative proportions of silver and its oxides in the electrodes. The amount of silver oxides present in the electrode will, in turn, indicate the state of charge of the electrode according to the following reactions:

(1) (discharged) (partially charged)
$$2Ag + H_2O \rightleftharpoons Ag_2O + 2H$$

(2) (partially charged) (fully charged)
$$Ag_2O + H_2O \rightleftharpoons 2AgO + 2H$$

The invention will more particularly be described in connection with the drawing wherein:

FIG. I is a graph representing the change in conductivity of an auxiliary silver electrode as a function of the state of charge of the cell showing the resistance of this electrode plotted against the percentage of ampere-hour capacity electrochemically stored in the electrode;

FIG. II is schematic sectional view of a battery according to this invention; and FIG. III is a diagram of the circuits involved in determining the state of charge of the battery.

Examination of the curve of FIG. I shows that only minor conductivity changes of the silver electrode occur during 80% of the charge/discharge cycle of the battery. The shape of the curve slopes sharply, however, during the initial and final stages each corresponding to approximately 10% of the charging phase. The marked increase in resistance upon the approach of full charge may be utilized to operate a device which can modify or disconnect the charger. The rapid rise in conductivity during the final portion of the discharge phase can similarly be utilized to indicate the need for recharging the battery or it can through auxiliary apparatus connect the battery with a charging device.

FIG. II shows a battery according to this invention whose casing 10 contains electrolyte 11 as well as positive electrodes 12a, 12b, 12c, connected to positive terminal 13, and negative electrodes 14a, 14b, connected to negative terminal 15. Included within casing 10 is a rod-like auxiliary electrode 16 connected to reference terminal 17 by a conductor 17' rising from its upper end. Electrode 16 is fabricated from the same active material as the positive electrodes and is connected to one of the latter electrodes, namely plate 12c, by means of a conductor 18 which is connected to the lower end of auxiliary electrode 16. The usual inter-electrode separators have been indicated at 19.

FIG. III is a circuit diagram of the battery of FIG. II associated with an indicating device 20, essentially a differential ammeter, which may be suitably calibrated to give either a reading in ohms or a direct state-of-charge indication, e.g. in arbitrary units or in percentage of capacity. The meter 20 has three terminals respectively connected to the battery terminals 13, 15 and 17, whereby a first deflecting element (e.g. a coil) 20' is connected between negative battery terminal 15 and main positive terminal 13 whereas a second deflecting element 20" is inserted between terminal 15 and auxiliary positive terminal 17. The positive and negative electrodes of FIG. II have been generally designated 12 and 14, respectively, in FIG. III. If the resistance of auxiliary electrode 16 is high (battery charged), a preponderance of current will flow through element 20' and will deflect the pointer of the instrument in a predetermined sense. As the discharged state is approached, the resistance of electrode 16 drops and the pointer gradually returns to its normal position.

Although in the diagram of FIG. III only the auxiliary electrode 16 is shown connected to have any effect upon meter 20, it will be seen from FIG. II that a substantial portion of main electrode 12c is included in series therewith between terminals 13 and 17. Thus, part of the voltage drop measured between these terminals by the meter 20 will be due to the change in conductivity of the principal electrode 12c itself. It is, therefore, possible to omit the auxiliary electrode 16 entirely and to connect the conductor 18 directly to the auxiliary terminal 17. The inclusion of an electrode 16 of narrow cross-section increases, however, the sensitivity of the indicator.

If a negative electrode (e.g. one of cadmium) had been included in the indicator circuit in lieu of a positive electrode as described above, maximum deflection of the pointer, occurring in the high-resistance condition of the electrode, would have been an indication of complete discharge rather than full charge.

It will be understood that the meter 20 of FIG. III could also be replaced by a simple two-terminal instrument connected alternately between terminals 15 and 13 and between terminals 15 and 17 for a visual comparison of its deflections when thus connected, and that such instrument might also be connected only between terminals 15 and 17 if the battery output voltage under load is substantially invariable over a large portion of its charge/discharge cycle. If an outside source of voltage is available, the resistance of electrode 16 and/or 12c can also be measured by directly connecting the meter across terminals 13 and 17 in series with such voltage source.

Although the auxiliary electrode should generally be of the same composition as the principal electrode to which it is conductively connected, it should not include any current-distributing network of good conductivity such as is often used to advantage in both the positive and negative electrodes of the battery.

The active material of the auxiliary electrode may be prepared into electrode form by depositing active material upon a non-conductive support designed to reduce the conductivity of the electrode body so as to establish a suitable resistance range between the fully charged and the discharged condition of the battery. Suitable supports include nylon fabrics and felts, cellulose esters and other polymeric fibers in felt or woven form as well as various inorganic materials such as glass wool and, with certain electrolyte compositions, asbestos. Porous rubber of the non-microporous species may also serve as a support for the active material of the auxiliary electrode.

I claim:

1. In an electrochemical battery, in combination, a liquid electrolyte, at least one positive electrode and at least one negative electrode wetted by said electrolyte, one of said electrodes containing an active material undergoing substantial changes in conductivity upon changes in the state of charge of the battery, and indicator means for ascertaining said state of charge, said indicator means including a resistance-measuring circuit connected across at least a portion of said one electrode.

2. The combination according to claim 1, wherein said active material consists of a mixture of silver and its oxides in varying proportions.

3. In an electrochemical battery, in combination, a liquid electrolyte, at least one positive electrode and at least one negative electrode wetted by said electrolyte, one of said electrodes containing an active material undergoing substantial changes in conductivity upon changes in the state of charge of the battery, a main terminal connected to said one electrode, an auxiliary terminal connected to said one electrode at a location remote from the latter's connection to said main terminal, and current-measuring means connected between said auxiliary terminal and said main terminal for indicating the state of charge of the battery.

4. In an electrochemical battery, in combination, a liquid electrolyte, a first electrode of one polarity wetted by said electrolyte, a first terminal connected to said first electrode, a second electrode of opposite polarity wetted by said electrolyte, a second terminal connected to said second electrode, said second electrode comprising an active material undergoing substantial changes in conductivity upon changes in the state of charge of the battery, a third terminal connected to said second electrode at a location remote from the latter's connection to said second terminal, and conductivity-measuring means connected in circuit with said second and third terminals for determining the state of charge of the battery.

5. The combination according to claim 4, wherein said conductivity means comprises a differential ammeter with two operating circuits connected between said first and second terminals and between said first and third terminals, respectively.

6. In an electrochemical battery, in combination, a liquid electrolyte, a first principal electrode of one polarity wetted by said electrolyte, a second principal electrode of the opposite polarity wetted by said electrolyte, an elongated auxiliary electrode of said opposite polarity wetted by said electrolyte and having one extremity connected to said second main electrode, said auxiliary electrode comprising an active material undergoing substantial changes in conductivity upon changes in the state of charge of the battery, a first terminal connected to said first main electrode, a second terminal connected to said second main electrode, a third terminal connected to the other extremity of said auxiliary electrode, and ammeter means connected between said third terminal and at least one of the other of said terminals for determining the conductivity of said auxiliary electrode as a measure of the state of charge of the battery.

7. The combination according to claim 6, wherein said second main electrode and said auxiliary electrode comprise active materials of substantially identical composition.

8. The combination according to claim 7, wherein said active material is a mixture of silver and its oxides.

9. The combination according to claim 6, wherein said one extremity is connected to said second main electrode at a location remote from the latter's connection to said second terminal.

10. The combination according to claim 6, wherein said auxiliary electrode comprises a non-conductive support and active material carried on said support.

11. The method of ascertaining the state of charge of an electrochemical battery, said battery having an electrode with an active material undergoing substantial changes in conductivity upon changes in said state of charge, which comprises measuring the electrical resistance of at least a portion of said electrode.

References Cited in the file of this patent

UNITED STATES PATENTS

| | | |
|---|---|---|
| 1,362,554 | Balzano | Dec. 14, 1920 |
| 1,594,814 | Brodin et al. | Aug. 3, 1926 |
| 1,974,187 | Malpass | Sept. 18, 1934 |
| 2,594,709 | Andre | Apr. 29, 1952 |

FOREIGN PATENTS

| | | |
|---|---|---|
| 254,852 | Great Britain | May 25, 1925 |

OTHER REFERENCES

Vinal, Storage Batteries, 4th ed., Wiley and Sons, 1955, pp. 234–236.